United States Patent [19]
Curtis

[11] 3,906,819

[45] Sept. 23, 1975

[54] TENSION-RESPONSIVE FASTENER DRIVE SYSTEM

[75] Inventor: Gary Martin Curtis, Elgin, Ill.

[73] Assignee: Illinois Tool Works Inc., Chicago, Ill.

[22] Filed: Jan. 6, 1975

[21] Appl. No.: 538,747

[52] U.S. Cl. ................................ 81/52.4 R; 173/12
[51] Int. Cl.² ................ B25B 27/00; B25D 23/142
[58] Field of Search .......... 81/52.4 R, 52.5; 173/12; 192/150

[56] References Cited
UNITED STATES PATENTS

| | | | |
|---|---|---|---|
| 2,789,597 | 4/1957 | La Torre | 81/55 |
| 3,247,741 | 4/1966 | Batten | 81/56 |
| 3,633,446 | 1/1972 | Kawasaki | 81/55 |

*Primary Examiner*—James L. Jones, Jr.
*Attorney, Agent, or Firm*—Olson, Trexler, Wolters, Bushnell & Fosse, Ltd.

[57] ABSTRACT

A tension-responsive fastener drive system is disclosed in which tension arising in a fastener is sensed by a feeler gauge. The gauge applies a retardive force to a sensing sleeve mounted for motion with the fastener drive shaft. When fastener drive shaft-sensing sleeve motion becomes unequal, or when the sensing sleeve is angularly displaced relative to the drive shaft, a stop mechanism is actuated to halt further fastener driving action. Thus, a predetermined tension can be applied to a fastener when the fastener is driven into or secured on a workpiece.

16 Claims, 15 Drawing Figures

TENSION-RESPONSIVE FASTENER DRIVE SYSTEM

BACKGROUND OF THE INVENTION

When using threaded or like fasteners, it is often desirable to drive the fastener into a workpiece until a predetermined amount of axial tension arises within the seated fastener. When this can be done, workpieces can be drawn together with known abuttive force, assemblies of precise dimension can be provided, and other desirable technical conditions can be obtained.

Joints which utilize a spring or resilient member functionally interposed between a fastener and a workpiece or between workpieces interconnected by a fastener are frequently used to maintain a known or relatively consistent tension within the fastener. However, such spring members may relax over a long period of time. In some applications, the spring member permits the joint to undesirably relax or deform under certain use conditions.

A number of fasteners, fastener drives and fastener systems have been offered in which the fastener is driven into a workpiece or is tightened until a predesignated torque force has been applied. However, since actual tension produced in a fastener or fastener joint is only roughly proportional to the fastener drive torque under certain conditions, the systems are correspondingly unreliable and inaccurate when creation of a given tension within the fastener is desired.

A tension indicating fastener unit which is relatively accurate in responding to tension applied to a fastener member is disclosed in co-pending U.S. Pat. Application No. 437,597, filed Jan. 28, 1974. In general, this application discloses a fastener having a relatively enlarged head and a reduced-diameter shank which may be driven into a workpiece, as by threads provided upon the shank. An axially compressible washer such as a conical washer is assembled over the shank below the fastener head. A freely rotatable cup-shaped ring gauge is positioned between the upper surface of the washer and the lower bearing surface of the fastener head or a nut. As the fastener head is drawn toward the workpiece, the conical washer compresses axially until the ring gauge is pinched between the washer and the fastener bearing surface. At this point, a predetermined tension has been provided in the fastener; this condition is signified by lack of rotatability of the pinched ring gauge.

It is a general object of the present invention to provide a fastener and fastener drive system which permit driving the fastener toward or into a workpiece or assembly until a predetermined axial tension is experienced in the fastener, whereupon fastener tightening action is automatically halted.

A more specific object of the invention is to provide a fastener drive system wherein the driving action is stopped in response to a fastener tension-sensing gauge. In the embodiment disclosed herein, this gauge takes the form of a ring gauge or annular feeler gauge surrounding a fastener shank and carried between a fastener head and a conical washer.

Another object of the invention is to provide a fastener system having a fastener driving device for tightening a fastener, and a sensing sleeve device for engaging the fastener-tension-responsive gauge. When tension is sensed, the sensing device operates to halt further fastener drive motion.

Still another object of the invention is to provide such a system which can be used with fastener drive devices which are electrically powered, fluid powered, or which are powered in other manners.

Yet another object of the invention is to provide a fastener drive system which is inexpensive in cost, yet reliable and rugged in operation.

Other objects and advantages of the invention will become apparent upon reading the following detailed description and upon reference to the drawings. Throughout the drawings, like reference numerals refer to like parts.

DETAILED DESCRIPTION

While the invention will be described in connection with preferred and alternate embodiments, it will be understood that it is not intended to limit the invention to these embodiments. On the contrary, it is intended to cover all alternatives, modifications and equivalents as may be included within the spirit and scope of the invention.

Figures 1, 3:
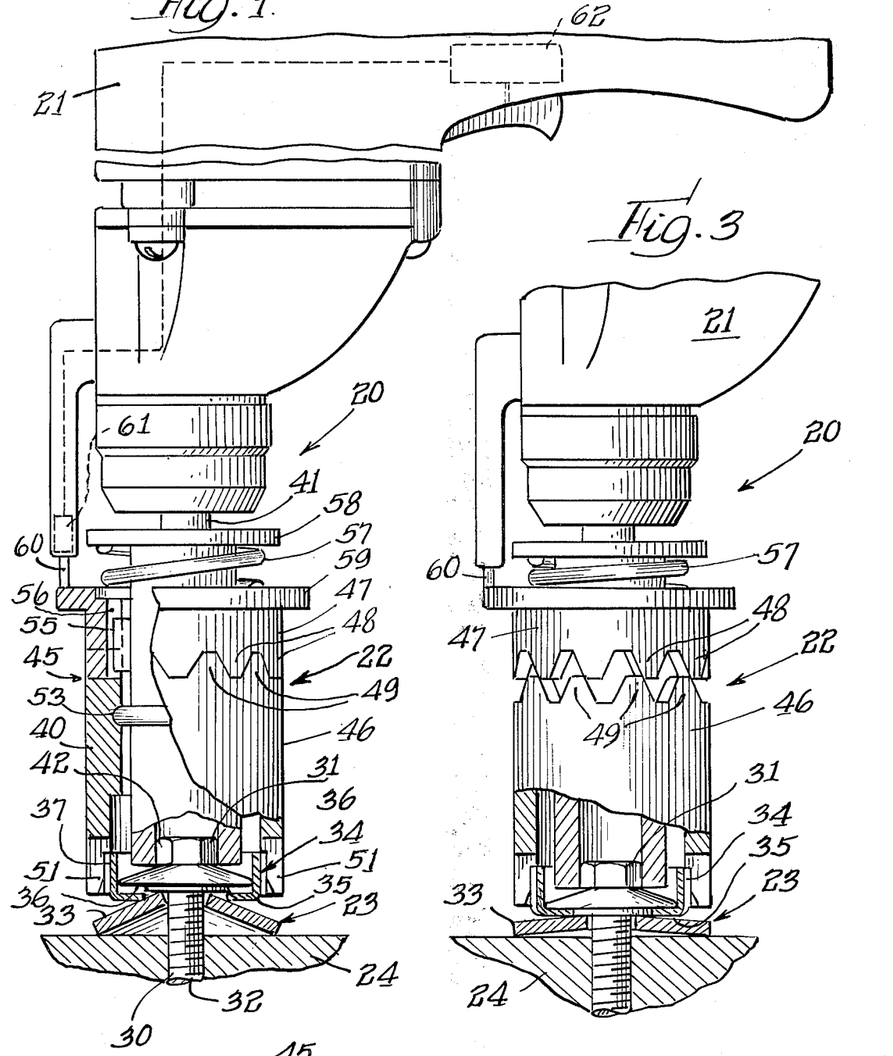
FIG. 1 is an elevational view in partial section showing one embodiment of the fastener and the novel fastener drive system as they appear when the drive system begins driving the fastener into a workpiece.
FIG. 3 is an elevational view in partial section similar to FIG. 1 and showing the drive system as it appears when the fastener has been relatively fully driven into a workpiece.
Figure 2:
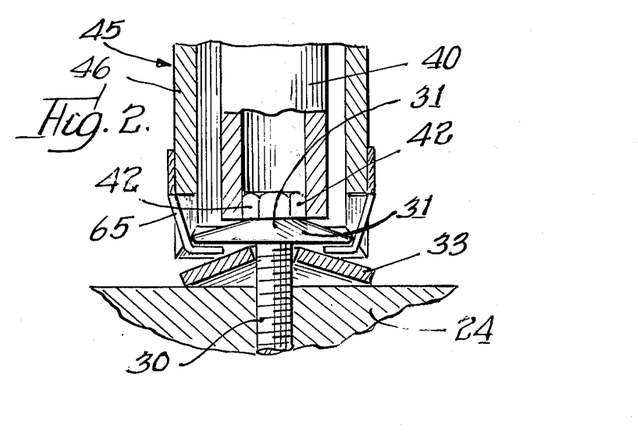
FIG. 2 is a fragmentary sectional and elevational view showing in detail the fastener and related parts of FIG. 1 in slightly modified version.

Turning first to FIG. 1–3, there is shown a fastener drive system 20 embodying the present invention. In general, this system 20 can be considered to comprise a drive power source 21, a drive coupler 22 and a fastener 23 adapted to be driven at least partly into a workpiece 24. Here, the power drive 20 is electrically operated. However, it is contemplated, as will be shown hereafter, that this power drive 20 can be of the fluid power or other known type without departing from the spirit and scope of the invention.

The illustrated fastener 23 includes a bolt-like member 30 having a driving head 31 and, formed integrally therewith, a threaded shank portion 32. Surrounding the shank 32 is a conical spring washer 33 which may be of the Bellville type. An annular or ring-like feeler gauge 34 terminates in an annular surface 35 which, as illustrated, is carried between and is adapted to be caught between the upper surface of the Bellville washer 33 and a lower bearing surface 36 partly defining the bolt head 31. An axially extending gauge cylinder portion 37 is adapted for mating with portions of the drive coupler 22, as will be more fully explained hereafter. It will be understood that during such time as the gauge 34 is not caught or squeezed between the bolt head 31 and the Bellville washer 33, the gauge can be rotated freely about the bolt shank 32, as may be envisioned from FIG. 1. When, however, the bolt is driven sufficiently into the workpiece 24 to flatten the Bellville washer 33, the annular portion 35 of the ring gauge 34 is, as illustrated in FIG. 3, squeezingly trapped between the bolt head 31 and the washer 33; further rotational motion of the ring gauge is frictionally inhibited or fully prevented, except insofar as the bolt head and Bellville washer both may turn. To inhibit rotation of the Bellville washer, small tangs (not shown) may be formed upon the Bellville washer 33 to engage the workpiece 24 and render the Bellville washer 33 stationary. Further description of the bolt, washer, and ring gauge and their co-action is contained in the above-referenced patent application.

In accordance with the invention, this fastener system 20 drives the fastener 30 until a predetermined tension is experienced or encountered by the fastener 30. When this tension is appropriately sensed by the feeler gauge 34 fastener driving action is stopped. To this end, the drive coupler 22 includes a driving socket 40 connected to an output shaft 41 of the power source 21. The driving socket 40 is formed with flats or other appropriate surfaces to engage corresponding flats 42 formed on the head 31 of the fastener 30. The invention contemplates that drive sockets 40 of various sizes may be provided or required to mate with fastener heads 31 of various sizes or shapes. When the power source 21 is actuated, the drive shaft coupling 40 interconnected with the fastener 30 drives the fastener 30 into the workpiece 24.

In further accordance with the invention, a torque sensing sleeve means 45 concentrically surrounds the coupling drive shaft means 40 and is adapted to grasp the feeler gauge 34. In the embodiment illustrated in FIGS. 1–3, this sensing sleeve 45 includes a first sleeve part 46 and a second sleeve part 47 formed with mating surfaces such as crown gear-like teeth 48 and 49 which interengage and cause the first and second portions 46 and 47 of the coupling 45 to rotate as a single unit absent the application of retardive torsional force applied to one part only.

To engage the ring feeler gauge 34, the lower extremity of the first sleeve part 46 is formed with gauge connector fingers 51. When the gauge 34 is grasped, the first sleeve part 46 and the gauge 34 rotate together when the sleeve is rotated. However, when a retardive force is applied to the gauge 34, rotational motion of the first sleeve part 46 is retarded or halted. As indicated above, such rotationally retardive force will be applied through the gauge in response to axially tensile forces incurred by the fastener 30.

To permit the first sleeve part 46 to rotate independently of the surrounded driving coupling 40, yet to substantially axially co-align the part 46 and the coupling 40, an O-ring 53 is provided. This O-ring discourages or inhibits relative axial motion between the coupling part 46 and the socket 40.

In contradistinction to the first coupling part 46 which is permitted rotational motion relative to the socket but which is inhibited from axial motion relative to the driving socket 40, the second coupling part 47 is permitted to undergo axial motion with respect to the driving socket 40, but is prohibited from rotational motion with the driving socket. To this end, spline teeth 55 interengage corresponding spline grooves 56 formed on the interior of the second socket part 47. A biasing member 57 such as a coil spring functionally inserted between a socket collar 58 and a coupling collar 59 normally forces the first and second coupling parts 46 and 47 into an axially compressed position such as that shown in FIG. 1.

Operation of the fastener drive system is relatively automatic. The drive socket 40 and drive shaft 41 rotate in a predetermined angular direction to cause the fastener 30 to be driven into the workpiece 24. As the fastener 30 is driven into the workpiece 24, both the fastener 30 and the surrounding ring gauge 34 are rotated at the same angular speed. However, as indicated in FIG. 3, when the ring feeler gauge 34 is compressed between the fastener head 31 and the Bellville spring 33, rotation of the feeler gauge 34 ceases. Since the second sensing sleeve part 46 is connected thereto, an angularly retardive force is applied to the second sleeve part 46, and angular rotation of the sleeve part 46 is retarded or ceases.

The drive shaft socket 40, the shaft 41 and sleeve 45 undergo substantially equal rotational motion in the absence of any angularly retardive force applied to any part of the sleeve 45. However, the second sleeve part 47, splined to the socket 40, continues to undergo angular rotation as the socket 40 is continued to be rotated by the drive means 21 and the drive shaft.

Under these circumstances, the inclined crown gear teeth surfaces 48 and 49 act as cam surfaces to axially separate the second sleeve part 47 from the first sleeve part 46, in response to the angular displacement of the still-rotating second sleeve part 47 and interconnected drive socket 40 relative to the now-stationary first sleeve part 46.

In further accordance with the invention and in response to this axial motion of the second sleeve part 47, an actuator pin 60 is driven upwardly by the second sleeve part collar 59. This pin 60 actuates, in turn, a stop device, which here comprises an electrical switch 61. Since the electrical switch 61 is interconnected to the power drive switch 62 as indicated in dotted lines in FIG. 1, the stop switch 61 halts rotation of the drive shaft, so that the fastener 30 is driven into the workpiece 24 until the predetermined amount of axial tension is experienced in the fastener, whereupon fastener driving action is automatically halted.

A slightly modified version of the device is shown in FIG. 2, where a feeler gauge 65 is shown permanently mounted or attached to the lower extremity of the sensing sleeve 45. By appropriate manipulation, this sensing gauge 65 can be removed from its illustrated position between the fastener head 42 and the Bellville washer 33.

Figures 4, 5, 6:
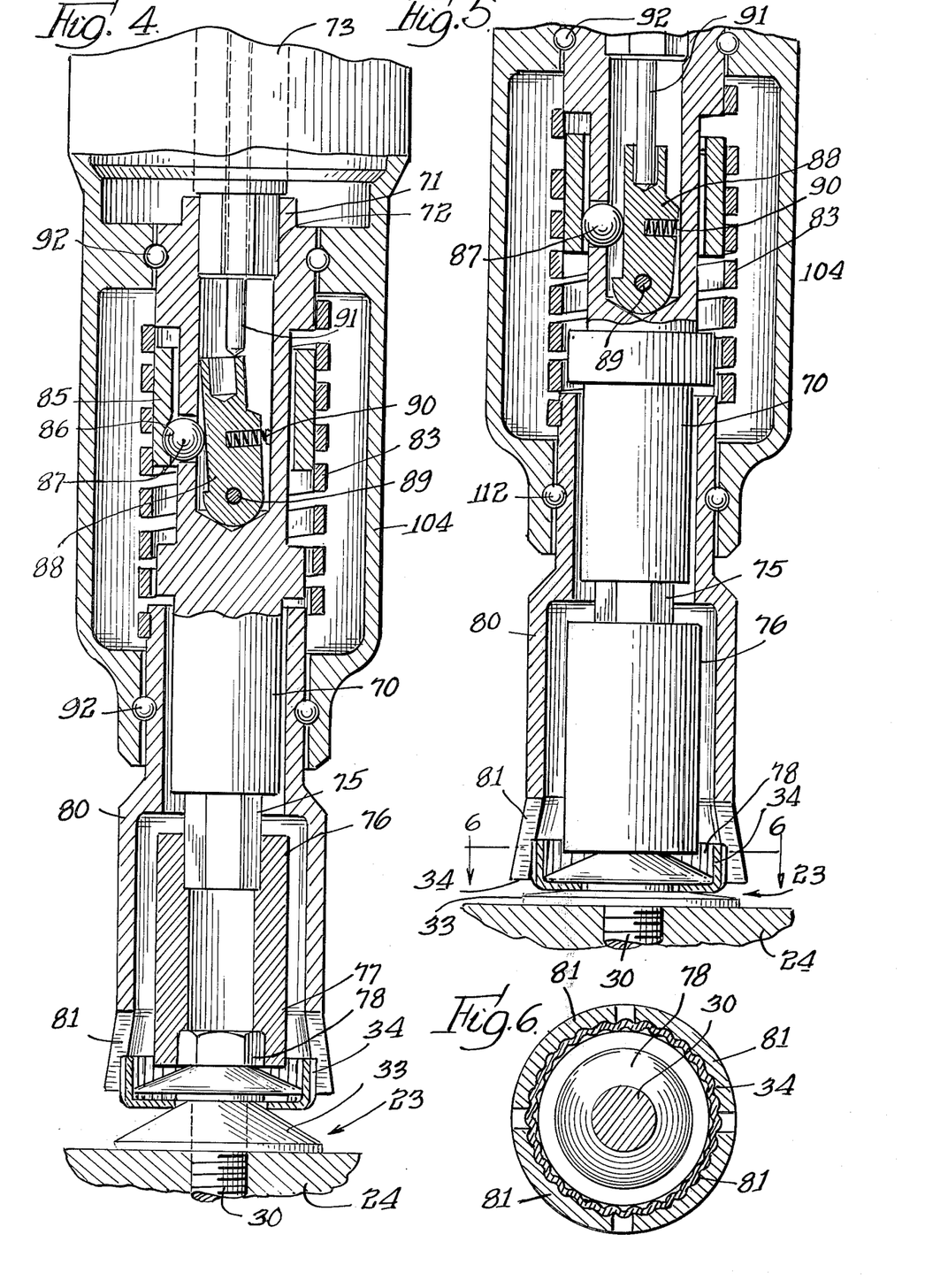
FIG. 4 is an elevational view in partial sections similar in orientation to FIGS. 1 and 3 showing an alternate embodiment of the fastener drive system as it appears when the fastener is beginning to be driven.
FIG. 5 is a sectional partial elevational and sectional view similar to FIG. 4 but showing the drive system as it appears when the fastener is relatively fully driven.
FIG. 6 is a sectional view taken substantially in the plane of line 6—6 in FIG. 5.

An alternate embodiment of the invention is illustrated in FIGS. 4-6 inclusive. Again, in accordance with the invention, a drive shaft device 70 is formed at an upper end 71 to accommodate flats 72 or other connector surfaces of a power shaft 73. At its lower end, the drive shaft means 70 terminates in flats 75 or other surfaces formed to accommodate a socket 76. Thus, rotation of the power shaft 73 causes rotation of the driving shaft 70 and the socket 76. The socket 76, in turn, is provided with flats or other surfaces to engage the flats 77 formed on a head 78 of the fastener 30.

Concentric with the drive shaft 70 is a sensing sleeve 80 having fingers 81 adapted to engage the annular feeler gauge 34. In carrying out the invention, a non-frictional interconnector — here, a coil spring member 83 — interconnects the drive shaft 70 and the sensing sleeve 80, and causes substantially equal rotation of the drive shaft and the sensing sleeve in the absence of angularly retardive force applied to the sleeve 80 through the gauge-grasping fingers 81.

In accordance with the invention, operation of the driving system is halted when a predetermined amount of tension has been applied to the fastener 30. Here, a stop device including a circular cam-like member 85 having a cam surface 86 is carried on the spring 83 and is adapted for co-action with a ball 87. Radially inward motion of the ball 87 moves an arm 88 pivotally attached, as by a pin 89, to the drive shaft 73. As described above, when a predetermined amount of tension has been applied to the fastener 30, the gauge 34 is squeezed between the Bellville washer 33 and the fastener head 78. Rotation of the feeler gauge 34 is thus halted and, in turn, a retardive angular force is applied to the sensing sleeve 80. This retardive force applied to the sensing sleeve 80 causes angular displacement of the sleeve 80 with respect to the drive shaft 70. Since the interconnector spring 83 is connected to both the drive shaft 70 and the sensing sleeve 80, the interconnector spring 83 undergoes a wrapping motion as may be envisioned by comparative reference to FIGS. 4 and 5. This wrapping motion angularly displaces the cam member 85 with respect to the drive shaft 70, thereby causing the member 87 to be moved radially inwardly from its position shown in FIG. 4 to the position shown in FIG. 5. This cam motion, in turn, moves the ball 87 and thus angularly displaces the arm member 88 against the biasing effect of a small spring member 90 from its running position shown in FIG. 4 to the stop position shown in FIG. 5.

When the arm 88 is so displaced, a stop pin 91 is permitted to fall from its armed position shown in FIG. 4 to the actuated position shown in FIG. 5; fall of this pin can be appropriately connected to a pneumatic driving motor, thereby causing the motor to cease operation and halt rotation of the drive shaft 73. Appropriate bearings such as ball bearings 92 permit smooth angular displacement of the sensing sleeve 80 relative to the drive shaft 70 while maintaining the sleeve and shaft in co-axial alignment.

Figure 7:
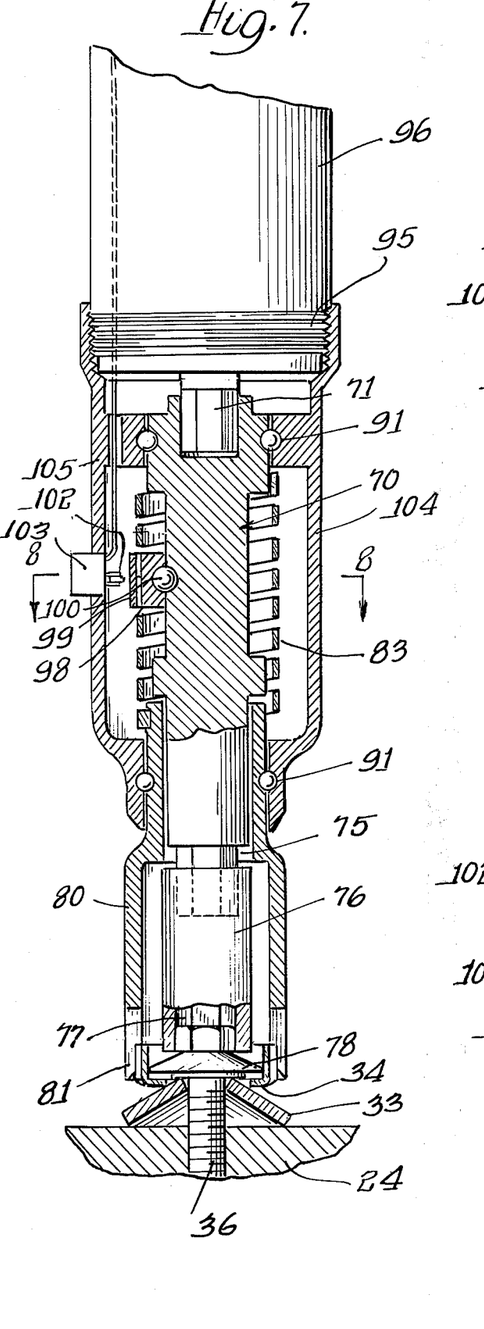
FIG. 7 is a fragmentary sectional view showing yet another embodiment of the invention as it appears before the associated fastener has been fully driven.
Figure 8:
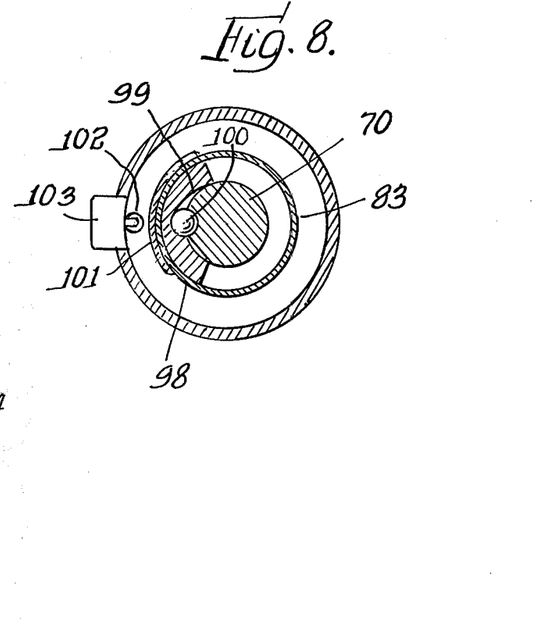
FIG. 8 is a sectional view taken substantially in the plane of line 8—8 in FIG. 7 showing the drive system as it appears when the fastener has been fully driven.
Figure 9:
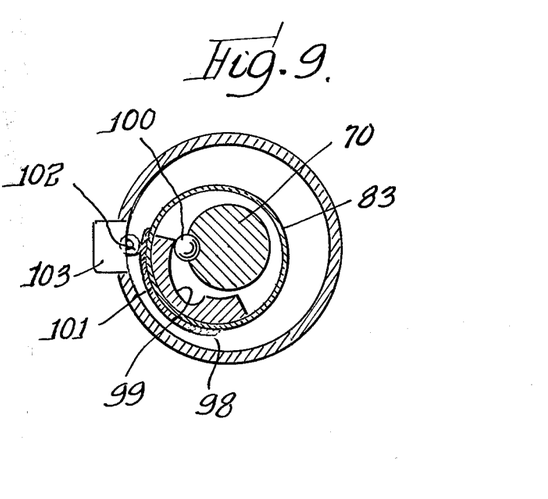
FIG. 9 is a sectional view taken substantially in the plane of line 8—8 and similar to FIG. 8 but showing the drive system components as they appear when the fastener has been driven to its final tensile stress.

Yet another embodiment of the invention is shown in FIGS. 7-9 inclusive. There, the driving system takes the general form of an attachment secured, as by threads 95, to the muzzle of an electrically energized power tool 96 or other device. Again, the fastener driving system can be considered to include a drive shaft 70 concentric with and at least partially surrounded by a sensing sleeve 80. As in other embodiments, sensing sleeve fingers 81 grasp a feeler gauge 34 functionally interposed between the head 78 of a fastener 30 and a Bellville spring 33 assembled over the fastener shank. An interconnecting coil spring 83 is provided with a modified cam member 98 having a cam surface 99 adapted to engage a ball member 100. Here again, the sensing sleeve 80 and drive shaft 70 undergo relative angular displacement when the fastener 30 is tensioned and the feeler gauge 34 is inhibited from further rotational motion, and this action causes relative displacement of the interconnector spring 83. Spring displacement forces the cam member 98 attached to the spring to undergo displacement relative to the ball member 100 mounted upon the drive shaft 70, thereby forcing at least a portion of the spring radially outwardly away from the drive shaft 70. This action, in turn, forces a cam member 101 also mounted on the spring into engagement with a probe 102 of an electrical switch 103 which can be conveniently carried upon a jacket 104 surrounding the drive shaft 70 and interconnector spring 83. Engagement of the electrical switch probe 102 operates the switch 103, as through appropriate wiring 105, thereby halting operation of the power tool and halting further rotation of the drive shaft 70.

Yet another embodiment of the invention is shown in FIGS. 10-13 inclusive. Again, in accordance with the invention, a sensing sleeve 80 is mounted, as by ball bearings 91, concentrically surrounding a drive shaft device 70. Grasping fingers 81 engage a feeler gauge 34 which is adapted to be squeezed between a fastener head (not shown) and a Bellville washer 33.

As in a previous embodiment, this sensing sleeve 80 can be considered to include a first or lower part 108 adapted for rotation with, and for angular displacement relative to the drive shaft 70, but inhibited from relative axial motion. An annular second section 109 surrounds a portion of the drive shaft 70 and is interconnected thereto by a pin member 110 to permit axial movement of the second part 109 relative to the drive shaft 70, but to prohibit relative angular displacement. Interconnecting the first and second parts 108 and 109 of the sensing sleeve 80 is an interconnector spring 112 which engages slots 113 or other appropriate attachment structure on both sleeve parts 108 and 109. By appropriately tensioning or compressing the spring 112 relative axial motion of the parts 108 and 109 can be caused in response to angular displacement of the shaft and sleeve.

Figures 10, 11, 12, 13:
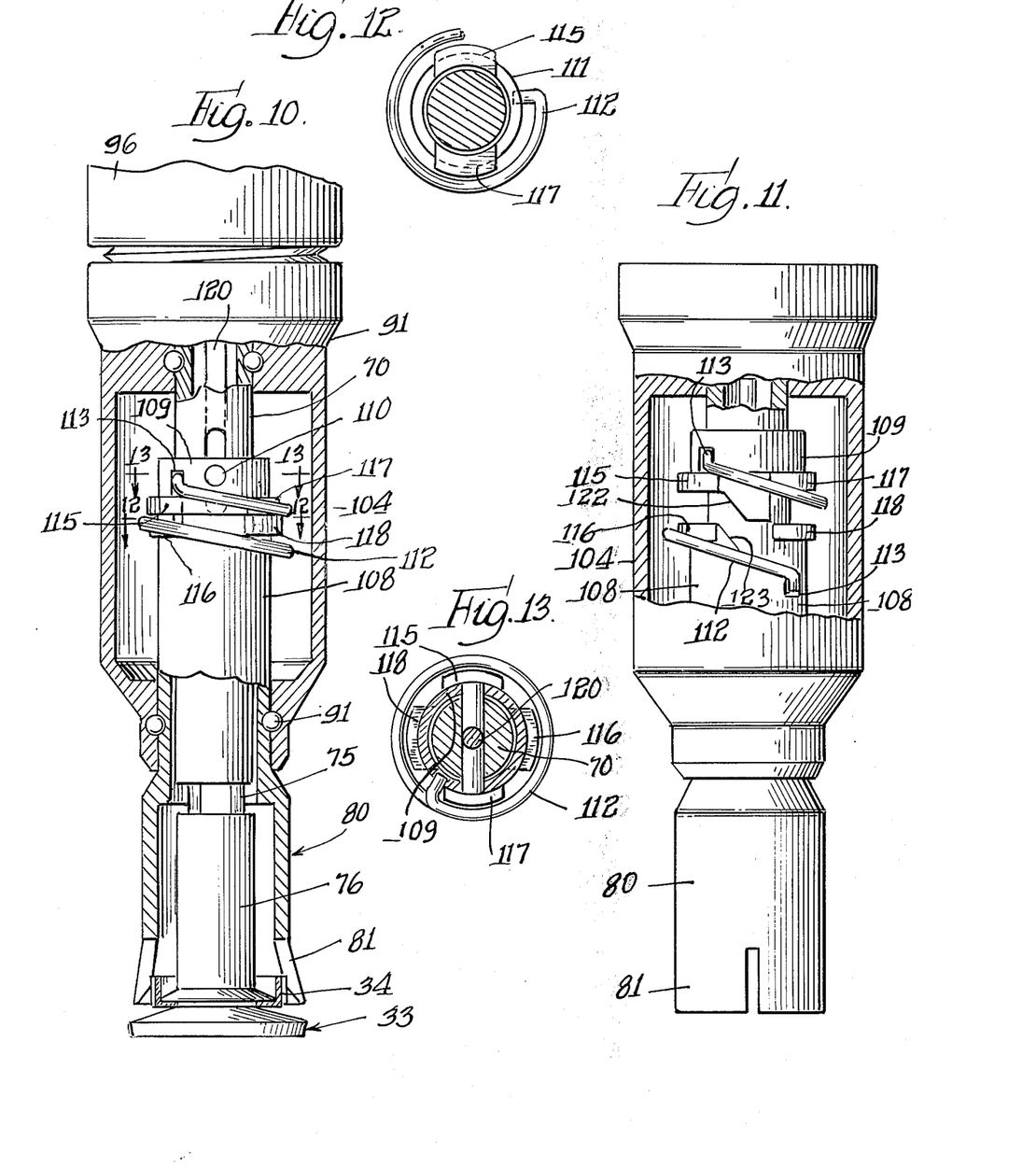
FIG. 10 is a fragmentary elevational view showing a further embodiment of the invention as it appears before the fastener has been fully driven.
FIG. 11 is a fragmentary elevational view similar to FIG. 10 but showing this embodiment of the invention as it appears when the fastener (not shown) has been fully driven to final tensile strength.
FIG. 12 is a fragmentary sectional view taken substantially in the plane of line 12—12 in FIG. 10.
FIG. 13 is a fragmentary sectional view taken substantially in the plane of line 13—13.

In furtherance of the invention, permanent magnets 115-118 inclusive can be mounted on the first and second sleeve members 108 and 109, respectively. By proper orientation of these magnets, the sleeve parts 108 and 109 can be caused to be axially attracted toward one another during initial fastener driving. However, as tension is experienced in the fastener and sensing sleeve 80 is angularly displaced relative to the drive shaft means 70, the magnets 115–118 will also be angularly displaced from one another. Again, if proper orientation of the magnets is provided, positive magnetic repulsion will occur, thereby forcing axial separation of the sleeve parts 108 and 109.

Axial motion of the top sleeve portion 109 — whether caused by spring biasing force, magnetic repulsion, or the spring biasing force overcoming magnetic attraction — moves the interconnector pin 110 axially upwardly as indicated in FIG. 10. Pin motion, in turn, moves a stop pin 120 upwardly to actuate a halt switch and terminate further fastener driving motion.

As particularly indicated in FIG. 11, axial separation of the first and second sleeve parts 108 and 109 can be further encouraged by providing inclined cam surfaces 122 and 123 on the sleeve parts. Here, this camming action encourages separation of the sleeve parts until the interconnector spring 112 can provide sufficient separating force to overcome the magnetically attractive force of the magnets 115–118.

Figure 14:
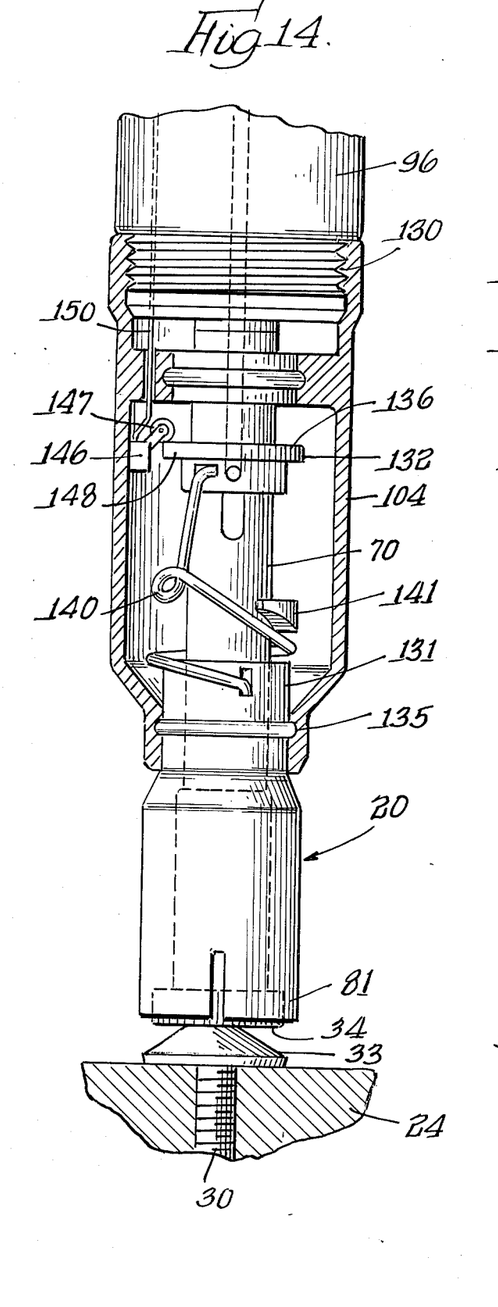
FIG. 14 is a fragmentary elevational view similar to FIG. 10 showing yet another embodiment of the invention as it appears before the fastener has been fully driven.
Figure 15:
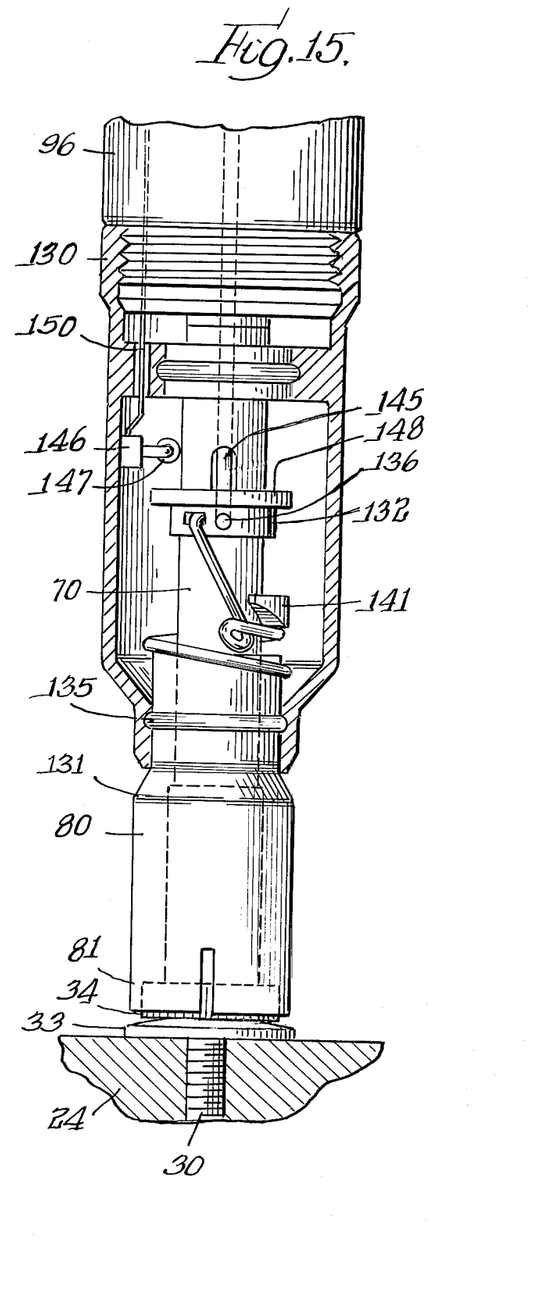
FIG. 15 is a fragmentary elevational view similar to FIG. 14 showing the invention as it appears when the fastener has been fully driven.

Yet another embodiment of the invention is shown in FIGS. 14 and 15. Again, the drive device can be attached, as by threads 130 to a power driving tool 96. Again, a drive shaft assembly 70 is provided, and is at least partly surrounded by a sensing sleeve 80 having fingers 81 engaging the tension-sensing gauge 34 which is adapted to be trapped between the head (not shown) of a fastener 30 and a Bellville spring 33. As in other embodiments, the sensing sleeve device here comprises two separate parts 131 and 132 which are axially movable relative to one another. A lower or first sensing sleeve member 131 can be mounted to the housing 104 as by a bearing 135 or by other appropriate structure. So mounted, this lower or first sleeve normally rotates with the drive shaft assembly 70. A second or upper sleeve member 132 is mounted for axial motion relative to the drive shaft assembly 70, but a pin 136 prevents shaft-sleeve angular motion.

As the fastener 30 is tensioned and further angular motion of the lower sleeve member 131 is prohibited, the upper sleeve member 132 is angularly displaced relative to the lower sleeve member 131. In the embodiment illustrated, an interconnector spring 140 is caused to engage a cam member 141 mounted upon the drive shaft assembly, and drags the upper sleeve member 132 in a downward direction. Such motion of the upper sleeve member relative to the lower sleeve member can be used to pull downwardly an axially oriented stop pin 145 to halt fastener drive motion. Alternatively, an electrical switch 146 can be provided with a probe 147 adapted to follow a collar 148 formed upon the upper sleeve member 132. Withdrawal of the collar 148 from contact with the switch probe 147 operates to actuate the stop switch 146; by appropriate wiring 150, a drive stop switch (not shown) can be actuated to halt further drive motion and further axial tensioning of the fastener 30.

Embodiments of the invention other than those shown will suggest themselves to those skilled in the art taught. For example, a differential gearing may be interposed between the power tool shaft and the fastener head drive shaft. A sensing sleeve can be driven from one main differential gear, while the fastener head drive shaft is rotated at equal angular speed but in the opposite angular direction by the other main differential gear. Ring-mounted pinion gears interconnect the two main differential gears; absent retardive force applied to the sensing sleeve, the positions of the pinion gears will remain stationary. When the sensing sleeve motion is retarded, however, the pinion gears and their mounting ring will be caused to be moved. This ring motion can be used to actuate a drive stop device. Appropriately adapted planetary gearing mechanisms and other embodiments of the invention will also suggest themselves.

The invention is claimed as follows:

1. A fastener drive comprising rotatable drive shaft means adapted for driving interconnection with a fastener to drive the fastener into a workpiece, sensing sleeve means rotatable with the drive shaft and adapted for interconnection with a tension sensing gauge actuated by tension in the fastener, at least a portion of the sensing sleeve being inhibited from rotation with the drive shaft when tension in the fastener is sensed by the interconnected gauge, and stop means for halting rotation of the drive shaft when rotation of the sensing sleeve is halted, whereby the fastener is driven into the workpiece until a predetermined amount of tension is experienced in the fastener.

2. A fastener drive according to claim 1 including actuator means for actuating the stop means in response to angular displacement of the sleeve relative to the drive shaft.

3. A fastener drive according to claim 1 wherein said sleeve includes first and second parts axially moved relative to one another in response to angular displacement of one sleeve part relative to the drive shaft means, said stop means being actuated by the sleeve part axial movement.

4. A fastener drive according to claim 3 including magnetic means carried on said first and second sleeve parts to magnetically urge said parts axially toward one another in a predetermined angular relationship relative to one another.

5. A fastener drive according to claim 3 including magnetic means carried on said first and second sleeve part to encourage axial separation of said parts in response to the angular displacement of one sleeve part relative to another.

6. A fastener drive according to claim 1 including means for carrying said sensing sleeve means in concentric relation with said drive shaft means.

7. A fastener drive according to claim 1 including power means for driving the drive shaft means in a predetermined angular direction to cause the fastener to be driven into the workpiece.

8. A fastener drive comprising a rotatable drive shaft means adapted for driving interconnection with a fastener to drive the fastener into a workpiece, sensing sleeve means rotatable with the drive shaft means and adapted for interconnection with a tension sensing gauge actuated by tension in the fastener, nonfrictional interconnector means interconnecting the drive shaft means and the sensing sleeve means for causing substantially equal rotation of the drive shaft means and the sensing sleeve means in the absence of angularly retardive force applied to the sleeve means and permitting angular displacement of the sleeve means relative to the drive shaft means in response to an angularly retardive force applied to the sleeve means, and stop means for halting rotation of the drive shaft means in response to angular displacement beyond a predetermined amount of at least a portion of the sensing sleeve means relative to the drive shaft means.

9. A fastener drive according to claim 8 wherein the sensing sleeve includes gauge connector means adapted to engage said tension sensing gauge with the sleeve, the tension sensing gauge being halted in its rotation and applying a retardive force to the sensing sleeve means in response to tensile forces arising in the fastener.

10. A fastener drive according to claim 8 including actuator means for actuating the stop means in response to angular displacement of the sleeve relative to the drive shaft.

11. A fastener drive according to claim 8 wherein said sensing sleeve includes first and second sleeve parts axially moved relative to one another in response to angular displacement of one sleeve part relative to the drive shaft means, said stop means being actuated by the sleeve part axial movement.

12. A fastener drive according to claim 8 including means for carrying said sensing sleeve means in concentric relation with said drive shaft means.

13. A fastener drive according to claim 8 including power means for driving the drive shaft means in a predetermined angular direction to cause the fastener to be driven into the workpiece.

14. A rotatable drive shaft means adapted for driving interconnection with a fastener to drive the fastener into a workpiece, sensing sleeve means rotatable about the drive shaft means and adapted for interconnection with a tension sensing gauge actuated by tension in the fastener, non-frictional interconnector means interconnecting the drive shaft means and the sensing sleeve means for causing rotation of substantially equal angular speed of the drive shaft means and the sensing sleeve means in the absence of angularly retardive force applied to the sleeve means and permitting the angular rotation of the sensing sleeve means to be retarded by an angularly retardive force applied to the sleeve means, and stop means for halting rotation of the drive shaft means in response to angular displacement beyond a predetermined amount of at least a portion of the interconnector means relative to the drive shaft means.

15. A fastener drive according to claim 1 wherein the sensing sleeve means is adapted to rotate in the same angular direction as the drive shaft rotation.

16. A fastener drive according to claim 1 wherein the sensing sleeve means is adapted to rotate in the opposite angular direction to the direction of rotation of the drive shaft.

* * * * *

UNITED STATES PATENT OFFICE
CERTIFICATE OF CORRECTION

Patent No. 3,906,819      Dated September 23, 1975

Inventor(s) Gary Martin Curtis

It is certified that error appears in the above-identified patent and that said Letters Patent are hereby corrected as shown below:

Col. 8, line 31, after "second" insert --sleeve--

Signed and Sealed this twentieth Day of January 1976

[SEAL]

Attest:

RUTH C. MASON
*Attesting Officer*

C. MARSHALL DANN
*Commissioner of Patents and Trademarks*